United States Patent
Zennaf et al.

(10) Patent No.: US 6,504,128 B2
(45) Date of Patent: Jan. 7, 2003

(54) APPARATUS FOR JOINING TOGETHER TWO METALLIC BANDS

(75) Inventors: Brahim Zennaf, Saint Chamond (FR); Francois Savaete, Soucieu En Jarrest (FR)

(73) Assignee: Vai Clecim, Nanterre Cedex (FR)

( * ) Notice: Subject to any disclaimer, the term of this patent is extended or adjusted under 35 U.S.C. 154(b) by 0 days.

(21) Appl. No.: 09/788,360

(22) Filed: Feb. 21, 2001

(65) Prior Publication Data

US 2002/0036189 A1 Mar. 28, 2002

(30) Foreign Application Priority Data

Feb. 21, 2000 (FR) .............................................. 00 02120

(51) Int. Cl.[7] .............................................. B23K 26/20
(52) U.S. Cl. .................................................. 219/121.63
(58) Field of Search ........................ 219/121.6, 121.63, 219/121.64, 121.82, 121.85, 161; 228/177, 212, 213, 5.7

(56) References Cited

U.S. PATENT DOCUMENTS 3,915,368 A * 10/1975 Ulmer ........................ 228/13
4,765,532 A * 8/1988 Uomoti et al. ............... 228/212
5,190,204 A * 3/1993 Jack et al. .................... 228/5.7
5,948,295 A * 9/1999 Perret et al. ............. 219/125.1

FOREIGN PATENT DOCUMENTS

| DE | 69 41 193 | 6/1970 |
| DE | 41 00 302 C1 | 2/1992 |
| EP | 0 438 615 A1 | 7/1991 |
| EP | 0 807 487 A2 | 11/1997 |
| FR | 58 010 A | 5/1969 |

* cited by examiner

Primary Examiner—Samuel M. Heinrich
(74) Attorney, Agent, or Firm—Arent Fox Kintner Plotkin Kahn

(57) ABSTRACT

The invention relates to a machine for butting two metal bands (M1, M2) and a method for implementing such a machine. According to the invention, two successive bands (M1, M2) are welded according to either one of at least two different welding modes, for example flash butt welding and laser welding. To this effect, two clamping jaw assemblies are available, suitable respectively to each welding mode and, when changing welding mode, the first jaw assembly (2, 3, 2', 3') used previously for welding is removed from the machine (S) and replaced with the second jaw assembly (20, 30, 20', 30') suitable to the second welding mode. During this operation, the jaws remain spaced apart so that replacement can take place as the first band unwinds to an end, before the running has stopped.

12 Claims, 7 Drawing Sheets

APPARATUS FOR JOINING TOGETHER TWO METALLIC BANDS

This invention relates to a machine for butting together two metal bands running after one another and a method for implementing such a machine.

In metallurgical installations, in particular in metal band production lines, we must often resort to connecting the ends of both successive bands by electric welding. For example, in band treatment installations, the said bands are generally wound into coils to go from operation to the next. To perform continuous work, for example in finishing lines, the downstream end must therefore be welded, in the running direction, of a band at the end of a treatment with the upstream end of the following band. We are then led to weld along a transversal line, generally perpendicular to the running axis.

Different means are used for this purpose. We can, for example, apply the ends of two bands over one another, but it is often necessary to butt-weld both bands, without any excessive thickness. In the butt welding process, both ends are shorn first of all, respectively downstream and upstream, of both bands, along two parallel lines, and the bands are then brought closer to one another so that the facing edges, heated at a certain temperature at which welding can take place, are made to contact each other.

Such an installation comprises therefore, generally speaking, means for shearing both parallel edges, means for applying both shorn edges towards one another and means for heating the ends of both edges in engagement, at a temperature where welding can take place.

For shearing and welding, both ends, respectively downstream and upstream of both bands are, generally, held by locking members mounted on both stands, respectively fixed and mobile, whereas each locking member comprises two vices provided with clamping jaws placed, respectively, on either side of a running plane of the bands, whereas at least one of the vices can be moved vertically from a position where the jaws are spaced apart to allow the bands to run, to a position where the jaws are close. to one another to hold the band.

In a known embodiment described, for example, in the document EP-A-0.135.133, the tools used, respectively, for shearing the edges and for welding, are placed after one another along the longitudinal running direction of the bands.

Such an arrangement increases the length of the machine and requires displacement of both bands from a shearing zone to a heating zone. Moreover, misalignments are possible during this transfer.

It has therefore been suggested that shearing and welding should be performed at the same location, whereas both bands remain locked between the jaws. In an arrangement often used, both locking members are connected respectively, to two terminals of an electric power source, and heating is conducted by forming short-circuits between two facing edges of both bands placed at different potentials. This is the so-called flash butt welding mode.

It is preferable, however, to apply over one another, under a certain pressure, the ends of both bands in order to provide a forging effect during welding. For an installation of this type described, for example, in the document EP-A-0.168.837, both locking members connected to an electric power source are therefore mounted on two locking stands, respectively, a fixed stand and a mobile stand that can be moved longitudinally with respect to one another.

Such installations are now used widely and have been subjected to various improvements.

For instance, in the arrangement described in document FR-A-2.756.504, all the operations can be conducted in a same working position between both locking members of the ends of both bands. Indeed, the various tools necessary for welding, such as shears and a planer, are placed on a tool carriage that can be moved longitudinally beside both stands of the machine, and connected to sliding means that enable to bring the various tools one after the other in the common working position.

However, the flash butt welding process is not applicable to all metals. In particular, for certain special steels, added elements may be oxidised, which makes the welded spots brittle. Moreover, the necessary increase in temperature may cause excessive hardening of the welded section.

Thus, we have been led to develop other welding modes. In particular, it is sometimes advantageous to use a laser torch emitting an extremely thin beam, which enables to reduce the zone affected by the welding.

In practice, however, conventional flash butt welding remains preferable for metals produced usually, whereas laser welding is provided for particular products.

Still, such products represent weights that, often, do not justify the realisation of a specific installation.

It is therefore interesting to have, in the same installation, means enabling, in order to suit requirements, to perform the welding operation, either flash butt welding or laser welding or even via another process.

However, modern installations are subject to conflicting requirements. On the one hand, they should meet the quite various needs of the clientele that, often, cannot be anticipated sufficiently in advance. On the other hand, for reasons of profitability, the bands run at high speed and downtimes, causing costly loss of production, should be avoided or, at least, reduced as far as possible.

Besides, we have also noticed that another difficulty was linked to the fact that the arrangements intended for flash butt welding do not comply necessarily with the requirements of the laser welding mode. In particular, it is necessary, in all cases, that the edges to be welded should be rectilinear and parallel but, in flash butt welding, a certain cantilever distance should be left between the shorn edge and the end of the clamping jaws to enable welding. The result can be slight deformation of the sheet metals that cannot ensure rectitude and sufficient parallelism of the edges for laser welding using a beam with very reduced sizes.

The purpose of the invention is to solve all these problems thanks to new arrangements that enable to change welding mode very quickly while having means available that enable, in all cases, to perform the welding operation under the best conditions.

The invention relates therefore, generally speaking, to a machine for butting together metal bands comprising two locking stands that can be moved longitudinally with respect to one another, on which are mounted, respectively, two members for locking, respectively, the downstream end, in the running direction, of a first band and the upstream end of a second band, each comprising, on either side of a running plane of the bands, two vices on which are fixed, in a removable fashion, two pairs of jaws for clamping, respectively, the end of each band, whereas the said vices can be moved from a spaced apart position in which the jaws can be removed, and a close position, and means for welding two parallel edges provided respectively on the said ends, respectively downstream and upstream, of both bands, after bringing the said edges closer to one another by longitudinal displacement of the said locking members towards one another, whereas the said welding means operate respectively at least according to two different welding modes.

According to the invention, the machine is provided with at least two clamping jaw assemblies suitable, for each assembly, respectively to each welding mode, whereas the said clamping jaws are mounted in order to slide over each corresponding vice and connected with transfer means, respectively of a first jaw assembly from a working position centred on the running axis to a laterally spaced apart standby position and of a second assembly, from a standby position to the working position.

The invention also relates to a butting method in which it is possible to weld two successive bands according to either of at least two different welding modes in relation to the nature and/or the thickness of the bands.

For this purpose, we have two clamping jaw assemblies suitable respectively to each welding mode and, when changing welding modes, the first jaw assembly used previously for welding according to a first mode is removed from the machine and replaced with the second jaw assembly suitable to the second welding mode, whereas the latter method may then take place under the best conditions.

In a particularly advantageous embodiment, the machine comprises a central guiding assembly comprising, on each stand, a pair of guiding paths provided respectively on both vices of each locking member and comprising each at least one supporting rail sliding, respectively for each jaw of the corresponding locking member, whereas each central guiding path extends transversally to the running direction, between two lateral sides of the stand of the machine and the said machine is connected with at least one standby chassis placed on at least one side of the machine and carrying at least one lateral guiding assembly comprising two pairs of guiding paths respectively for both jaws of each locking member each comprising at least one rail placed respectively in the extension of the corresponding rail of the corresponding vice, at least in a relative position of the standby chassis with respect to both stands to allow transfer, by sliding on the aligned rails, of a first clamping jaw assembly from their working position to the standby chassis and, conversely, of a second clamping jaw assembly from the standby chassis to the working position.

In a preferred embodiment, the machine comprises two lateral guiding assemblies, respectively, a first lateral assembly that is empty initially for the reception of a first clamping jaw assembly from the working position by sliding over the aligned rails, respectively of the central guiding assembly of the said first lateral assembly, and a second lateral guiding assembly for standby support of a second clamping jaw assembly and transfer of the said clamping jaws into the working position after retraction of the said jaw assembly and alignment of the rails of the said second lateral assembly with those of the central guiding assembly.

Thus, a first clamping jaw assembly is mounted, in working position, on the central guiding assembly and a second clamping jaw assembly is mounted in standby position on the rails of a lateral guiding assembly provided on a second standby chassis, whereas the machine comprises means for simultaneous transfer of the second jaw assembly from its standby position to the working position on the central guiding assembly with retraction of the first jaw assembly and transfer of the said assembly from its working position to a standby position on a lateral guiding assembly provided on a first standby chassis, on the other side of the machine.

Usually, each locking member comprises two vices on which are mounted, respectively both clamping jaws, whereas the said vices are movable with respect to one another perpendicular to the running plane from a position for clamping the jaws and a spaced apart position.

In such an arrangement, the rails of both lateral guiding assemblies are placed at levels corresponding respectively to the levels of the rails of the central assembly provided respectively on both vices of each locking member, in the position where the clamping jaws are spaced apart, in order to allow replacement of the said jaws while passing, respectively, above and below the running plane of the bands.

Thanks to this arrangement, the jaws can be replaced when the vices are spaced apart, by sliding the jaws, respectively above and below the band and without engagement with the said band. Thus, when changing welding mode between the downstream end of a first band and the upstream end of a second band, the first jaw assembly placed in the machine and suitable to the previous welding mode can be removed from the machine and replaced with a second assembly suitable to the following welding mode, as the first band is running to an end and without stopping the said from running.

The machine according to the invention enables, in particular, either flash butt welding or laser welding. The machine comprises then two clamping jaw assemblies, respectively a first jaw assembly suitable to flash butt welding and each comprising a removable fastening section on the corresponding lengthened vice, on the side of the edge to be welded, by quite a thick lip to enable application of a forging pressure between the edges to be welded and a second jaw assembly suitable to laser beam welding and each comprising a removable fastening section on the lengthened vice, on the side of the edge to be welded, by a nose extending to the vicinity of the edge to be welded in order to maintain the band over its whole width during the shearing process, whereas the said nose is rather thin to allow passage of a laser beam emitting torch.

But the invention will be better understood by the following description of a particular embodiment, described for exemplification purposes and represented on the appended drawings.

FIG. 1 is a diagrammatical above view of a welding machine S for connection of the ends, respectively downstream and upstream, of two metal bands M1, M2 running successively along a longitudinal direction x'x, over a running path, for example a roller table T.

Figure 2:
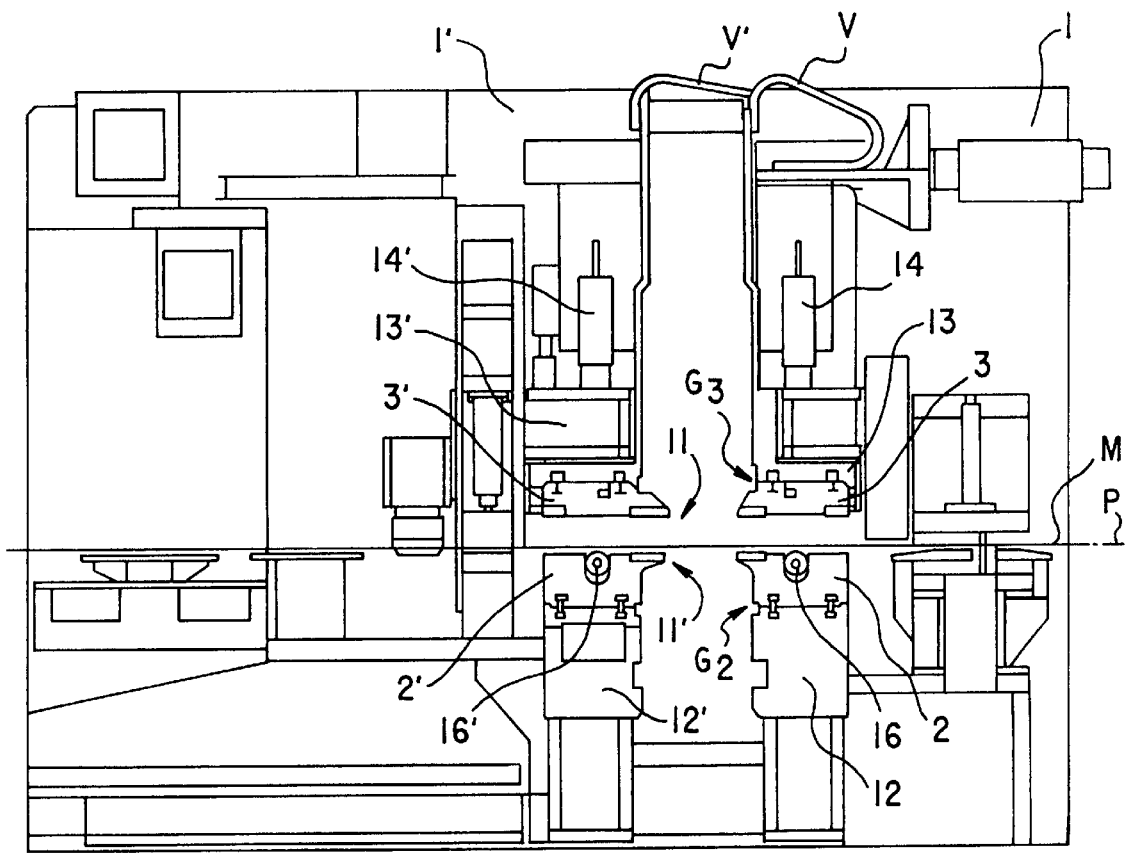
FIG. 2 is a longitudinal sectional view along the line II—II of FIG. 1.

The welding machine S, represented diagrammatically as an elevation view, on FIG. 2 is of the type described, for example, in the French patent n° 2.756.504 and comprises two locking stands, respectively a fixed stand 1 and a mobile stand 1' on which are mounted locking members provided with two clamping jaws, respectively a fixed locking member 11 and a mobile locking member 11'.

Conventionally, the fixed stand comprises essentially two uprights. spaced apart from one another and connected by crossbeams in order to form a rigid stand fixed to the foundation socle 10 and the mobile stand 1' also comprises a stand that is mounted to slide parallel to the longitudinal axis x'x, between both uprights of the fixed stand, whereas the displacement of the mobile stand is controlled by actuators.

The fixed locking member 11 comprises two vices, respectively a lower vice 12 and an upper vice 13 on which are mounted clamping jaws, respectively a lower jaw 2 and an upper jaw 3.

The lower vice 12 forms a fixed pedestal integral with both uprights of the stand 1 and bearing against on the foundation socle 10.

The upper vice 13 is mounted to slide vertically between both uprights of the stand 1 and be operated by at least one actuator 14, in order to clamp the jaws. Empty travel back upwards and level adjustments of the upper vice 13 are controlled advantageously by double-action working actuators.

The mobile locking member 11' is realised similarly and comprises therefore two vices 12', 13' on which are mounted, respectively, a lower jaw 2' and an upper jaw 3', whereas the clamping process is controlled by actuators 14'.

The metal band M moves inside both stands 1, 1' along a horizontal running plane P1 and passes between the jaws of both locking members 11, 11' that are represented in open position on FIG. 2. The lower jaws 2, 2' are connected with back-up rolls 16, 16' of the band that, however, must be independent of the jaws, as can be seen below.

Thus, when two bands run successively, it is possible to lock respectively the downstream end or 'tail' of the first band M1 between the fixed jaws 2, 3 and the upstream end or 'head' of the following band M2 between the jaws 2', 3' of the mobile locking member 11'.

Figure 1:
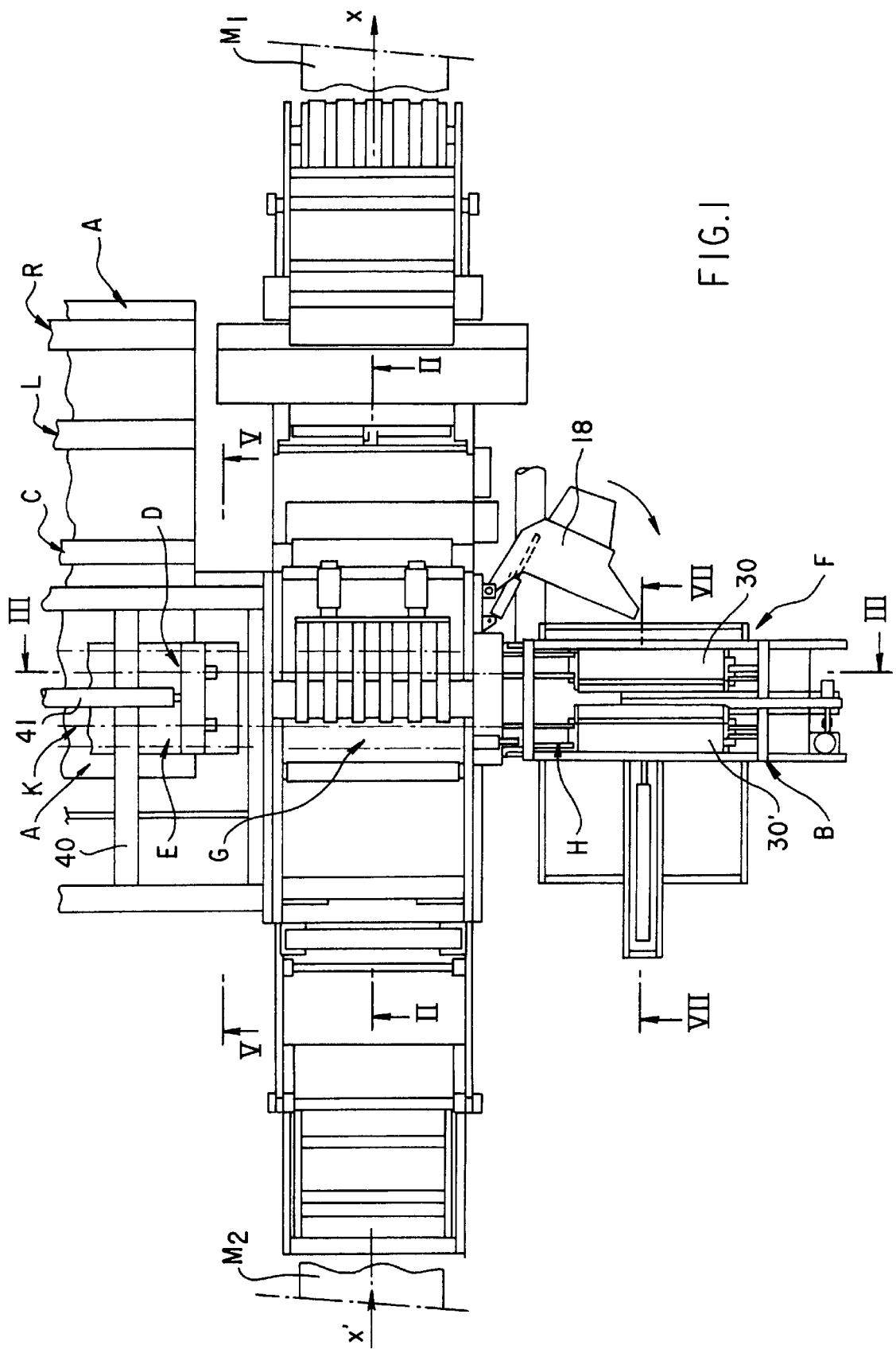
FIG. 1 is a diagrammatical above view of the whole machine according to the invention.

Besides, as shown diagrammatically on FIGS. 1 and 2, the jaws of both locking members, respectively fixed and mobile, are connected respectively, by conductors V, V' to both terminals of an electric power source.

The ends of both bands, thus clamped between the jaws of both locking members 1, 1' are first of all shorn along two rectilinear and parallel edges m1, m2. To this end, it is advantageous to use a double shears of the type described in detail in the French patent n° 2.756.504 already mentioned.

In this known, so-called 'flash butt welding' process, the shorn edges are engaged by displacement of the mobile stand 1' and the clamping jaws are tensioned. There are then short-circuits, along the joint, that cause local fusion of the metal.

Usually, a certain application pressure is maintained to keep both edges in contact in order to cause a forging effect of the welding.

To bring both sheet metals closer, the shearing plane of each edge is thus spaced apart from the ends of the jaws by a certain distance, called 'cantilever' distance.

To maintain the pressure necessary to the forging during welding, the clamping jaws of each locking member 1, 1' must have quite a massive shape.

Besides, the jaws should be replaceable and are therefore fixed in removable fashion on the vices, respectively 12, 13, 12', 13' of each locking member 11, 11'. For example, in the arrangement described in detail in the French patent n° 2.756.504, each upper jaw 3, 3' can be separated from the corresponding vice 13, 13' to rest on the lower jaw 2, 2' and the assembly can be removed by sliding transversally along corresponding guiding sections of the lower vices 12, 12'.

To this end, the following items are used advantageously: a replacement tool mounted in a standby chassis, placed beside the welding machine and comprising a table situated at both lower vices and on which is mounted to slide, transversally, a hanging carriage provided with a removable hook that engages on both pairs of superimposed jaws in order to remove them from the machine and bring them onto the table by sliding transversally.

The worn jaws can then be removed from the standby chassis and replaced with new jaws that are inserted in the machine by displacement in reverse direction.

In the arrangement of the French patent n° 2.756.504, the welding machine is associated with a tool carriage on which are placed a double shears, a replacement tooling and, possible, a tooling for planing the welding spot. By lateral displacement of this carriage, it should be possible to bring these different tools successively into a common working position centred on a working plane perpendicular to the running direction and along which the various tools may slide, in turn.

Such an arrangement enables, moreover, placing on the tool carriage a laser welding tool, which gives the possibility of realising either flash butt welding or laser welding according to the nature of the bands to be welded.

However, as stated above, the clamping jaws intended for flash butt welding do not, normally, meet the requirements of the laser welding mode.

The invention enables easy replacement of the usual jaws with special clamping jaws that improve the shearing conditions without disturbing the passage of the laser torch. This way, facing edges, rigorously rectilinear and parallel, can be realised on the ends of both sheet metals, and applied perfectly onto one another, over the whole width of the joint to be welded, during the passage of the laser torch.

Besides, the invention enables very quick replacement of the clamping jaws without stopping the band from running, as the coil unwinds completely.

To this end, the welding machine is connected with two standby chassis, respectively on either side of the machine, and allowing on the one hand to remove the jaws in operation in order to transfer them onto a first standby chassis and on the other to transfer into the machine the replacement jaws situated on the second standby chassis.

In a particularly advantageous embodiment, one of the standby chassis can be mounted on a tool carriage of the type described in the French patent n° 2.756.504 already mentioned. This tool carriage A is represented diagrammatically, as an elevation view, on FIG. 4 and comprises, mainly, a horizontal frame 4 mounted to slide inside a fixed frame 40 on guiding rails 41 parallel to the longitudinal running direction x'x. The following items are mounted on the chassis 4: several transversal guiding paths, respectively a first path 4a for a. replacement tool D, a second path 4b for a double shears C, a third path 4c for a laser welding equipment L and a fourth path 4d for a planer R.

Thus, by lateral displacement of the tool carriage A, it is possible to place either of the tools D, C, L, R, in a common working position centred in a mean plane Q perpendicular to the longitudinal running direction x'x. As shown on FIG. 4, which is a side view along the line III—III of FIG. 1, the frame 10 carries a working actuator 41 centred on the transversal mean plane Q and whose rod is provided with a hooking head that may engage in a removable fashion, on the tool placed on this working plane by lateral displacement of the carriage A. As described in the previous patent, it is thus possible, after clamping the ends of both bands, to control first of all transversal displacement of the double shears in order to shear both parallel edges, then to bring them together and, after welding, to bring into the working plane a planing tool R for flattening the welding spot when the said has been realised by flash butt welding.

In case of laser welding, after shearing the edges of the ends of two bands, the tool carriage A moves laterally in order to centre on the working plane Q the guiding path 4c of the laser welding tool L and the said tool is moved transversally, along the joint, by the same working actuator 41.

However, as stated, it is necessary that the welding machine should be provided with clamping jaws suitable to laser welding.

As it is known, in such an installation, we seek to clear one side of the running path of the band, called 'operating side', for monitoring the operation, whereas the driving means and the appended members are placed, normally, on the other side called 'driving side'.

As shown on FIG. 1, for quick replacement of the clamping jaws, two standby chassis are used, placed on either side of the welding machine S, respectively a first chassis E mounted on the tool carriage A already mentioned and a second chassis B making up an auxiliary carriage placed on the other side.

The tool carriage A, that is rather cumbersome, is placed normally on the driving side according to the arrangement described in the French patent n2.756.504 already mentioned. It therefore carries the standby chassis E of the 'flash butt welding' jaws, in the way represented diagrammatically on FIGS. 4 and 5.

Figure 3:
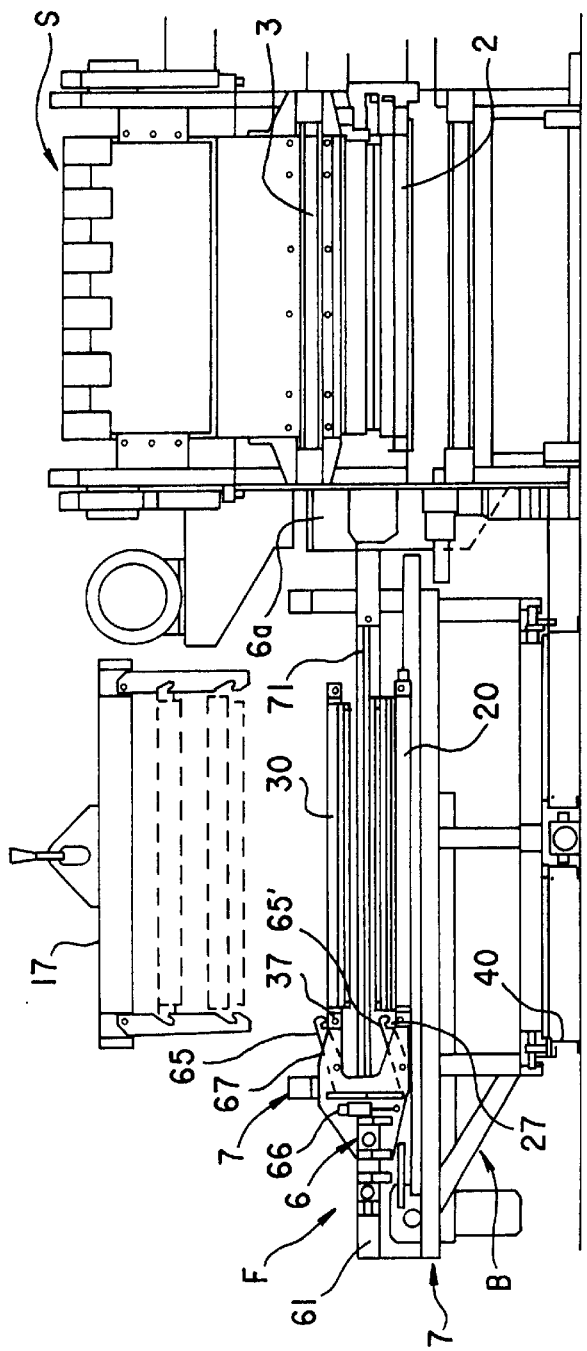
FIG. 3 shows the standby chassis of the 'laser-welding' jaws, as a transversal sectional view along the line III—III of FIG. 1.

The auxiliary carriage B that only serves as a spare unit for the 'laser' jaws, may be of smaller sizes, and is therefore placed on the operating side, as indicated on FIGS. 1 and 3.

Generally, each standby chassis E, B must be provided with a jaw guiding assembly consisting of rails placed at the same level and in the extension of corresponding rails provided on the vices 12, 13, 12', 13' of both stands 1, 1' of the machine, in order to allow transfer of both pairs of jaws of the machine S onto a standby chassis and conversely, by sliding on the aligned guiding assemblies, perpendicular to the longitudinal running axis x'x.

When the programme of manufacture involves the necessity of changing welding modes, it is interesting to change the jaws in advance, before the downstream end of the running band reaches the welding machine. The massive jaws suitable to flash butt welding are thus removed from the machine and transferred onto the standby chassis E mounted on the tool carriage A, in the position indicated on FIG. 4. They are replaced immediately, in the machine, by clamping jaws suitable to laser welding and coming from the auxiliary carriage B. The tool carriage A may then be moved laterally in order to place the shearing member C on the working plane Q and it is only once the downstream end of the first band has reached this plane that the running process is stopped. Then shearing takes place in the manner described below. After shearing, the shears C is brought back onto the tool carriage A that is moved forward further in order to centre the laser welding equipment L on the working plane Q and welding takes place. Running can then resume, whereas the second band is driven by the first. Thus, the downtime of the machine has been limited to the time necessary for shearing, moving the tool carriage and laser welding.

However, to obtain minimum downtime, the jaws should be replaced without stopping the band from running, whereby the said band remains engaged in the welding machine. To this end, the jaws, respectively upper and lower jaws, of both locking members must be held spaced apart vertically while moving, in order to travel, respectively, above and below the band.

Moreover, each jaw must be fastened to the corresponding vice in a removable fashion to allow removal by transversal sliding of the jaw.

Figure 2A:
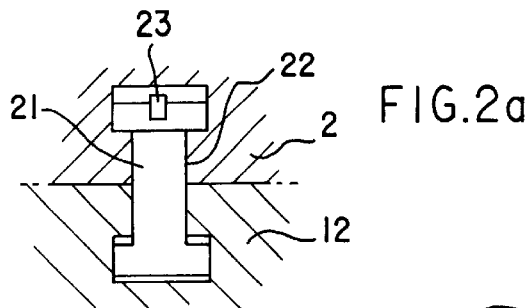
FIGS. 2a, 2b are detailed views at enlarged scale, of the jaw fastening and guiding means.

As shown diagrammatically on FIG. 2, each lower jaw 2, 2' is fastened to the corresponding vice 12, 12' by two rows of double T-section actuators 21 each comprising a lower section, forming a piston, housed in a chamber provided in the vice 12 and a flared upper section that engages into a groove 22 of the corresponding profile, provided in the lower section of the jaw 2. Moreover, as shown on FIG. 2a that is a detailed view at enlarged scale, the upper section of each actuator 21 carries a roller 23 with an axis parallel to the longitudinal axis x'x that, in the high position of the actuator 21, rests on the bottom of the groove 22 in order to lift the jaw 2.

The actuators 21 are of the double-action type and determine, therefore, in one direction application and fastening of the jaw 2 on the corresponding vice 12 and, in the other direction, slight lift of the jaw 2 that may slide axially by rolling over the rollers 23.

Both rows of actuators 21 sliding in the grooves 22 of the jaw 2 constitute a guiding path G2 of the said jaw.

The band M, that remains engaged in the machine, is held by back-up rolls 16, 16' that are mounted to rotate, respectively, on the sides of the corresponding stand 1, 1', whereas each roll 16, 16' passes through a corresponding recess of the lower jaw 2, 2' with sufficient clearance to enable vertical displacements of the jaw 2.

Figure 2B:
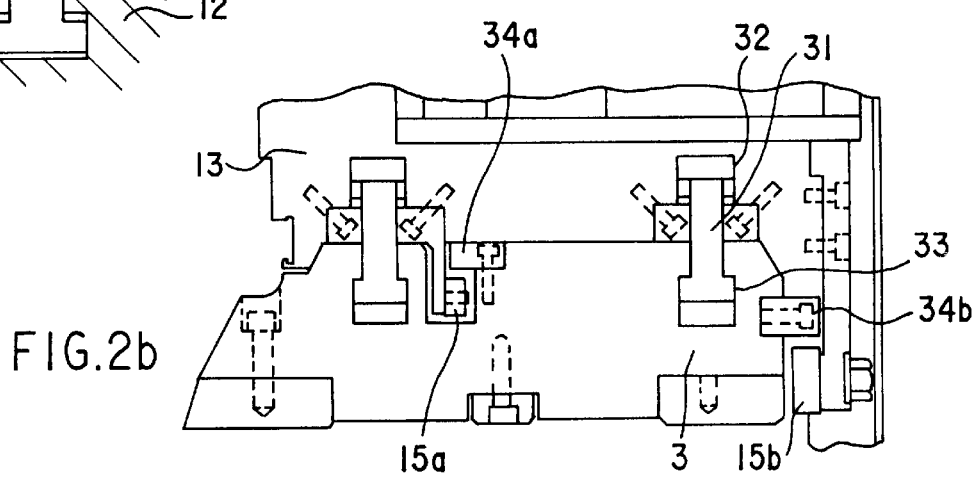

Above the band M, each upper jaw 3, 3' is fixed on the corresponding vice 13, 13' by actuators 31 arranged in two rows perpendicular to the longitudinal direction x'x. As shown on FIG. 2b, which is an enlarged view of the upper jaw 3, each actuator 31 exhibits a double T section and comprises an upper part forming a piston, housed in a recess 32 of the upper vice 13 and forming the chamber of a double-action actuator, and a lower section that engages into a transversal groove 33 of corresponding profile, provided on the upper section of the jaw 3. The said jaw is provided with two structural bars 34a, 34b that bear, in lowered position, respectively on two rows of rollers 15a, 15b mounted on suspension tabs fixed on the corresponding upper vice 13.

Thus, the double-action actuators 32 determine, in one direction, the lifting of the upper jaw 3 that the rests against and is fixed to the vice 13 and, in the other direction, the lowering of the jaw 3 that then rests on the rollers 15a, 15b that make up a raceway G3 co-operating with the grooves 33 to ensure slide-guiding of the jaw 3, perpendicular to the longitudinal direction x'x, at a level determined by rollers 15.

Obviously, removal of the jaws takes place in a determined position of the vices, respectively lower 12, 12' and upper 13, 13'. To this end, the lateral uprights of both stands 1, 1' are provided with guiding rail sections, not represented, placed respectively at the level of guiding paths G2, G3 comprising, respectively, the rows of rollers 23 of the lower jaws 2, 2' and rollers 15 of the upper jaws 3, 3', in the removal position of the said jaws.

As stated above, to remove the jaws or to put them back, two replacement tools D and F are used, mounted on two standby chassis E, B placed respectively on either side of the machine S and carrying guiding paths placed at the same level and in the extension of the guiding paths G2, G3 of the vices and rail sections carried by the lateral uprights of both stands 1, 1'. Thus, it is possible to remove both pairs of jaws or, conversely, to put them back, while passing above and below the band that remains engaged in the machine.

Figure 4:
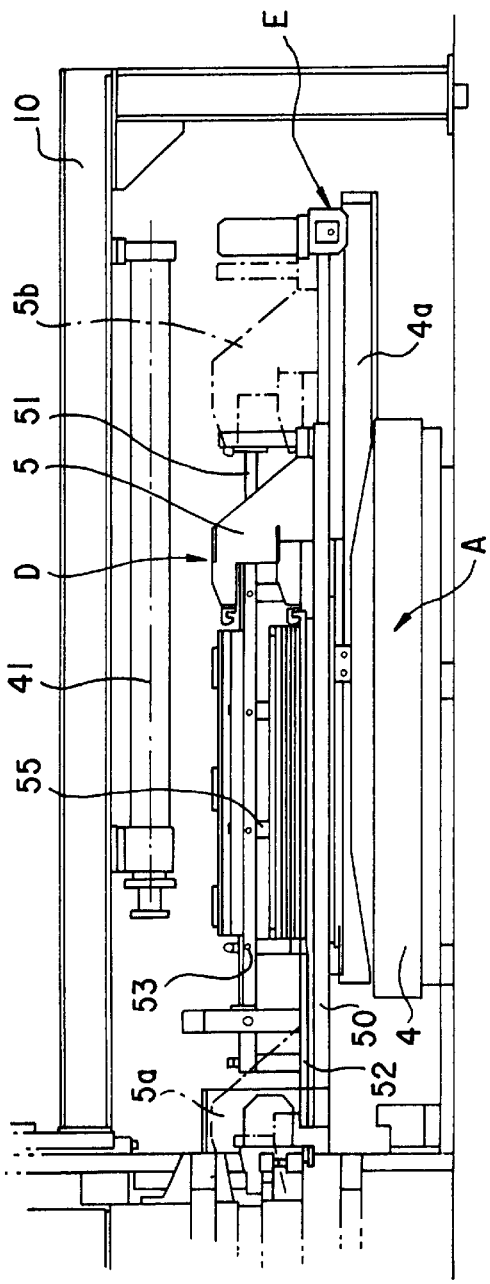
FIG. 4 shows the standby chassis of the 'flash butt welding' jaws, as a transversal sectional view along the line III—III of FIG. 1.

FIG. 4 is an elevation view of a tool D for replacing both pairs of 'flash butt welding'jaws 2, 3, 2', 3' of massive type, represented on FIG. 2 in their operating position for which they are fixed to the corresponding vices 12, 13, 12', 13'.

As stated previously, the tool carriage A comprises of a chassis 4 on which are mounted several transversal guiding paths. and, in particular, a guiding path 4a for a tool D intended for replacing 'flash butt welding' jaws, and which is mounted in a standby chassis E that may slide on the guiding path 4a between a forward position (indicated as a full line on FIG. 4) for which the end of the standby chassis E is close to the welding machine S and a backward position (indicated as a dotted line), which enables displacements of the tool carriage A.

Figure 6:
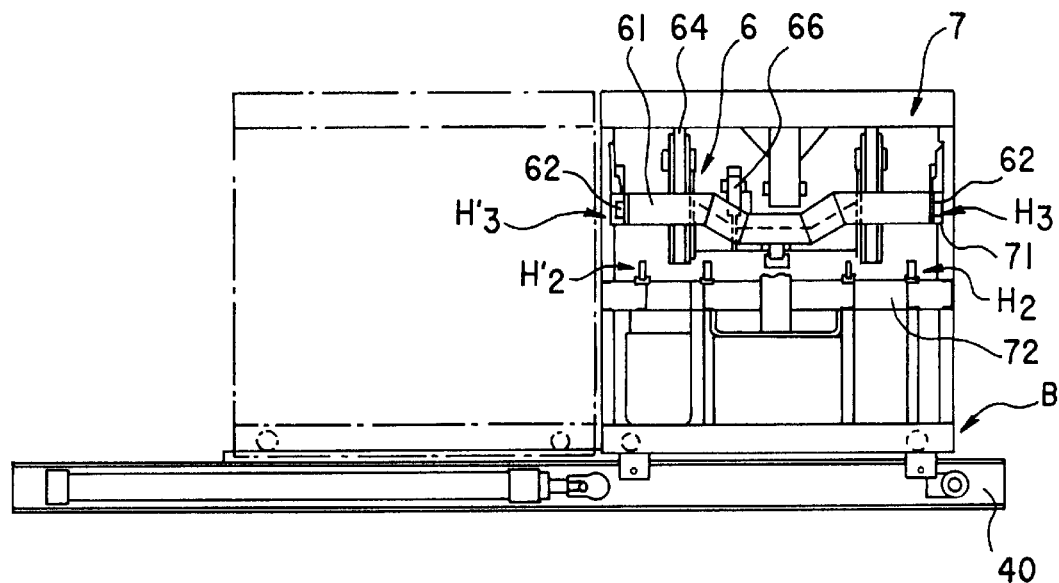
FIG. 6 shows a rear view of the standby chassis of the 'laser-welding' jaws.

Similarly, the tool F intended for replacing the jaws suitable for laser welding is mounted in a standby chassis B making up an auxiliary carriage placed on the other side of the tool carriage A with respect to the machine S and which may move, parallel to the longitudinal axis x'x, over rails 42, between an operating position, represented as a full line on FIG. 6, for which both pairs of laser jaws are centred on the working plane Q and a backward position represented diagrammatically as a dotted line on FIG. 6 and for which the welding machine S is clear on the operating side.

As indicated diagrammatically on FIG. 1, the machine S is advantageously provided with a hood 18 connected to a suction system intended for welding residues. This hood is mounted to pivot on the fixed stand 1 and may be pushed aside in order to bring the auxiliary carriage B forward in a position to replace the jaws and may be put back in position after transferring, in the machine, the laser jaws and retraction of the carriage.

The auxiliary carriage B comprises of a stand-shaped chassis 7 inside which the replacement tool F is mounted to slide perpendicular to the longitudinal axis x'x of the machine.

The replacement tool F comprises a member 6 for hanging the jaws, mounted on a carriage consisting of a chassis 61 in the form of a horizontal plate, which is supported by two pairs of rollers 62 that may roll inside C-section corners 71 provided on both sides of the chassis 7 of the auxiliary carriage B.

The hanging member 6 is carried by two flanges 64 spaced apart and fixed to the plate 61 and on which are hinged two pairs of hooks, respectively upper hooks 65 and lower hooks 65', consisting of two hinged arms about horizontal axes and forming a deformable parallelogram, operated by an actuator.

The flanges 64 carry themselves two pairs of fixed arms 67 that abut against the laser jaws 20, 30 and the said jaws are provided with hanging rods 27, 37 which, in the abutment position, are placed at the level of notches provided at the ends of the hanging arms 65, 65'. Thus, after hanging on the rods 27, 37, the carriage 6 may remove or push the laser jaws 20, 30 aside, either to insert them into the welding machine A, or to remove them.

To this end, the chassis 7 of the auxiliary carriage B supports a guiding assembly H comprising two stages of transversal guiding members H2, H3 placed respectively by, and in the extension of, the corresponding guiding members G2, G3 of the machine S, in the removal position of the jaws.

Figure 7:
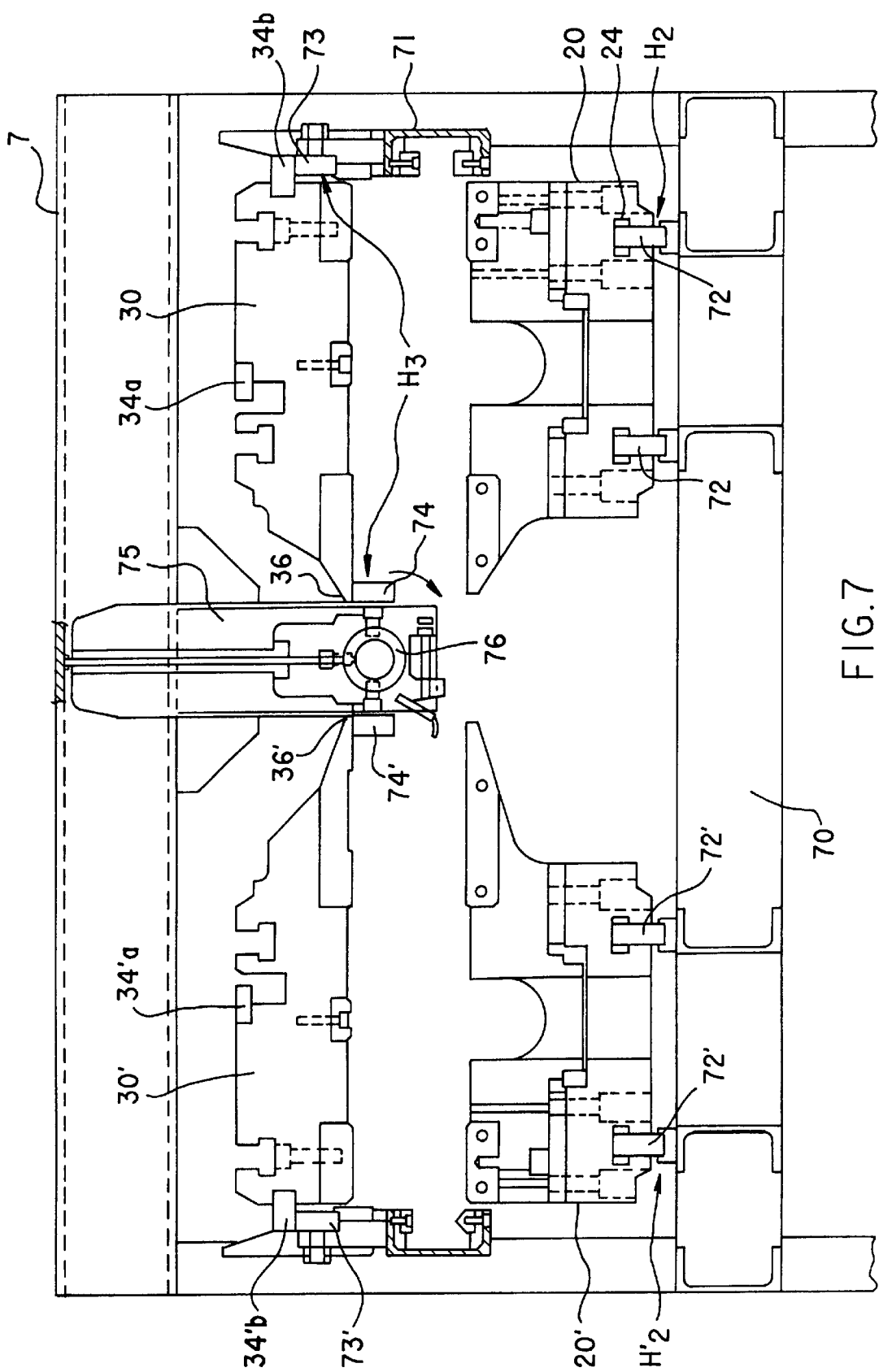
FIG. 7 represents the standby chassis of the 'laser-welding' jaws, as a transversal sectional view along the line VII—VII of FIG. 1.

These guiding members H2, H3 are represented in detail on FIG. 7 that is a transversal section view of the upper part of the stand 7 of the tool intended for replacing the 'laser' jaws.

At the lower level, the chassis 7 carries an intermediate table 70 on which are mounted two lower guiding paths H2, H'2 each composed of a pair of horizontal rails 72 that are placed in the extension of the rows of actuators 21 and whose upper faces are provided by the rollers 23 making up the central guiding path G2, in the removal position of the lower jaws 2, 2'.

At the upper level, the supporting chassis 7 of the replacement tool F is provided, on its sides, respectively with two rows of rollers 73, 73' forming an upper guiding path H3 that extends at the same level and in the extension of the central guiding path G3 comprising both rows of supporting rollers 15b, 15b' of the rear sections of the upper jaws 3, 3' in the lifted position of the vices 13, 13'. In this position, the rear rollers 15b, 15b' of the vices 13, 13' form therefore, with the rollers 73, 73' of the chassis 7, a continuous raceway on which the flats 34b, 34'b may slide, placed respectively at the rear of both upper jaws 30, 30'.

It would also be possible to place, at the upper section of the chassis 7, two rows of rollers arranged respectively in the extension of the rows of back-up rollers 15a, 15a' of the front section of the jaws 3, 3'. However, after retraction of the welding machine, it should be possible to return the jaws to the workshop, for verification and it is advantageous, to this end, to remove them from the chassis 7.

FIG. 3, for example, represents a removal lifting beam 17, operated by a travelling crane and carrying two pairs of hinged hanging arms that may engage on working rods 27, 37 of the clamping jaws in order to lift the said jaws and to transport them to the workshop for maintenance or replacement.

To enable lifting the upper jaws 30, 30', the former rest simply on a central back-up line of the chassis 7, comprising of two rows of rollers 74, 74' mounted on vertical uprights 75 fixed to a central beam of the chassis 7, on the longitudinal plane of symmetry of the said chassis and that delineate a back-up plane placed by the lower faces of the front ends 36, 36' of both upper jaws 30, 30' when the said jaws are in removal position.

Thus, when a jaw 30 is removed from the welding machine S, the central guiding path G3 consisting of the rows of rollers 15a, 15b on which rest the structural bars 34a, 34b, is replaced with a lateral guiding path H3 consisting, for each upper jaw 30, of both rows of rollers 73 and 74 on which rest, respectively the rear section and the front end 36 of the jaw 30. Displacement of the said jaw takes place therefore without changing the level from the machine S to the standby chassis B and, conversely, in the other direction for inserting the standby jaws into the machine S.

In order not to disturb the lifting motion of the lower jaws 20, 20' to remove them from the chassis 7, the back-up rollers 74, 74' are mounted on a shaft 76 that may rotate around a horizontal axis. As the shaft 76 rotates, the rollers 74, 74' become oriented on the longitudinal plane of symmetry of the supports 75 and do not block the passage of the lower jaws 20, 20' any longer.

FIG. 4 represents the replacement tool D for the 'flash butt welding' jaws, which is similar to the replacement tool F for the 'laser' jaws and comprises therefore a hanging member 5 mounted to slide perpendicular to the longitudinal axis x'x, on a standby chassis E comprising a horizontal table 50 mounted to slide on the guiding path 4a of the tool carriage 4 and two lateral uprights carrying guiding rails 51 of a supporting table of the hanging member 5.

The chassis E is provided, on the other hand, with a lateral guiding assembly K similar to the guiding assembly H of the standby chassis B of the laser jaws, comprising two levels K2, K3 placed at the same level as the corresponding paths G2, G3 of the central assembly G, respectively a lower guiding path K2 consisting of two pairs of rails 52 mounted on the lower table 50, in the extension of the rows 21 of the vices 12,12' and an upper guiding path K3 comprising two rows of rear back-up rollers placed in the extension of the rows of rollers 15b and two rows of front back-up rollers mounted on spaced apart supports, on the longitudinal plane of symmetry of the chassis E, at the level of the lower faces of the upper jaws 3, 3'.

The arrangements that have just been described enable to replace flash butt welding jaws with laser welding jaws and vice versa, without stopping the band from running and within a few minutes, whereas this operation can also be performed as the coil unwinds to its end.

By reference for instance to FIG. 3, the welding machine S is provided with massive jaws, respectively lower 2 and upper 3, suitable to flash butt welding. In order to replace these jaws, the tool carriage A and the auxiliary carriage B are moved laterally first of all in order to centre on the working plane Q, respectively the supporting chassis E of the 'flash butt welding' jaws which, at that moment, is empty and the chassis B on which are placed the 'laser' jaws 20, 30 in standby.

The hanging carriage 5 of the 'flash butt' welding jaws is then brought forward, which is identical to the hanging carriage 6 of the 'laser' jaws and therefore. carries two pairs of hooks that, in the forward position. 5a illustrated as a dotted line on FIG. 4, engage on hooking rods 27, 37 of the 'flash butt' jaws 2, 3, 2', 3'.

Pulling the hanging carriage 5 backward enables then transfer of the flash butt welding jaws on the chassis E in the position represented as a full line on FIG. 4, by sliding on the guiding paths K2, K3 of the standby chassis E.

Thus, the chassis assembly E, together with the hanging carriage 5 and the jaws, are pulled backward into the position 5b represented as a dotted line on the right of FIG. 4, in order to clear the driving side of the welding machine S.

Once the 'flash butt' jaws have been so removed, they can be replaced with the 'laser' jaws 20, 30 by bringing the hanging carriage 6 forward up to the position 6a represented as a dotted line on FIG. 3. The 'laser' jaws slide horizontally in the fashion indicated above on the guiding paths H2, H3 in order to rest inside the machine S. The lower jaws 20 run over the lower central path G2 comprising of the rollers 23 of the rows of actuators 21 and the upper jaws 30 run over the upper central path G3 comprising the rows of rollers 15a, 15b of the upper vices 13, 13'.

The clamping actuators 21, 31 can then be operated in order to apply and fix the 'laser' jaws 20, 20', 30, 30', respectively on the lower vices 12, 12' and on the upper vices 13, 13' of both stands 1, 1'.

All these operations can be performed quite quickly. In particular, bringing the 'laser' jaws from the chassis B, on the left of the machine on FIG. 3, can be simultaneous to the retraction of the 'flash butt' jaws on the chassis E, on the right of FIG. 4. Replacement of the jaws is therefore almost immediate.

Both pairs of 'laser' jaws being thus fixed on the vices, respectively 12, 12' 13, 13' the first band M1 and the following band M2 are brought forward so that their ends, respectively downstream and upstream, are located on either side of the working plane Q. Then the upstream jaws 20, 30 are clamped onto the band M1 and the downstream jaws 20', 30' on the band M2 in the position represented on FIG. 7.

Then the ends of both bands M1, M2 can be shorn off.

To this end, a double shears 8 of the type described in the previous patent 2.756.504 is used advantageously. It comprises two pairs of circular blades, respectively an upper blade 8a and a lower blade 8b. Two shearing planes are thus delineated, respectively upstream E1 and downstream E2 spaced apart on either side of the working plane Q.

For adequate shearing, the blades of each pair are placed on either side of the shearing plane, whereas the upper blades 8a are offset, preferably, inwardly and the lower blades 8b outwardly.

As indicated previously, the 'laser' jaws 20, 30 and the 'flash butt' jaws 2, 3 are fixed and guided in the same manner on the vices 12, 12', 13, 13' of both locking members, but they differ essentially by the shape of their front part turned toward the shearing plane.

Figure 5:
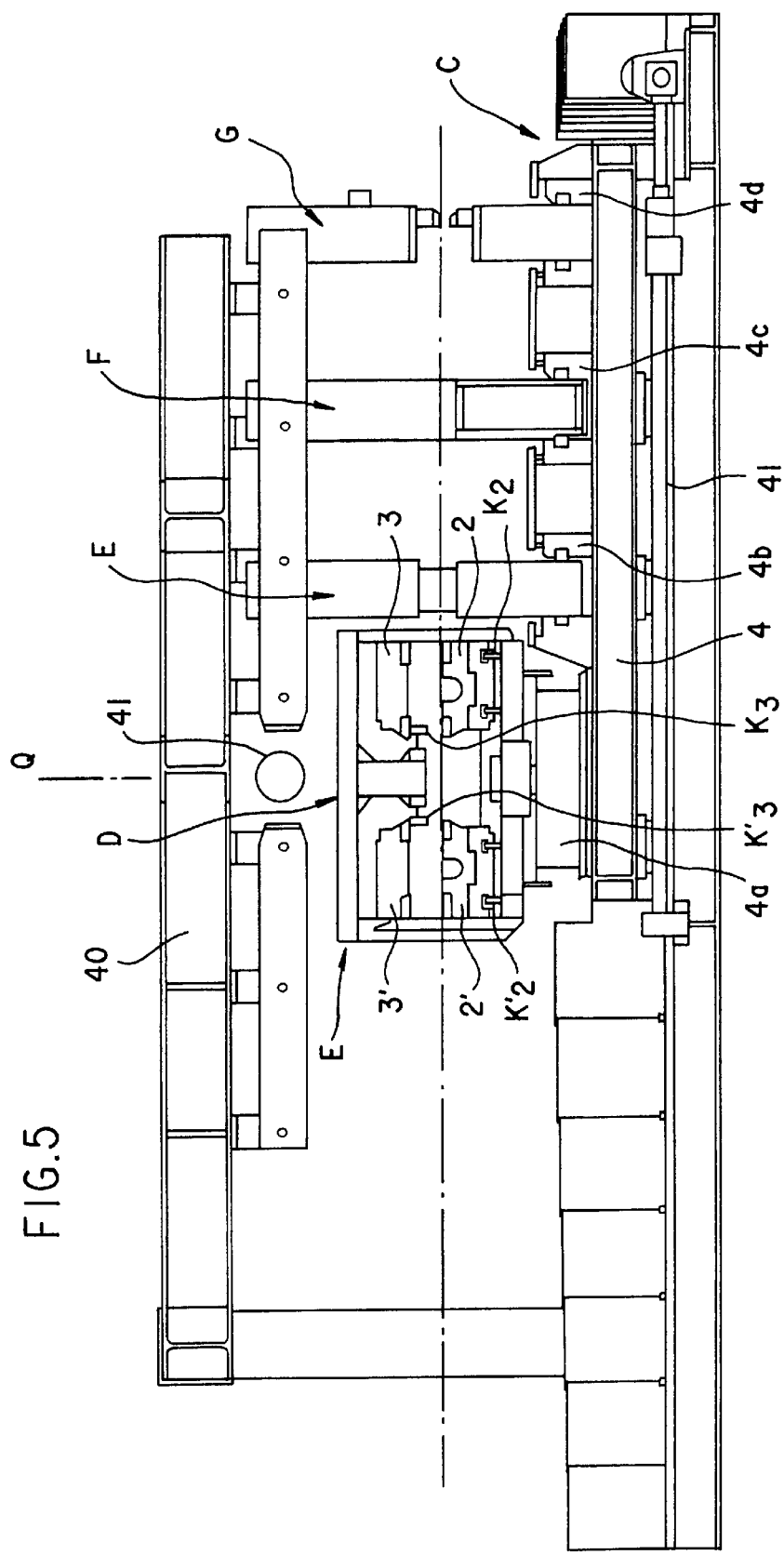
FIG. 5 shows the whole tool carriage, as a side view along the line V—V of FIG. 1.

The 'flash butt' jaws are realised conventionally and, as shown diagrammatically on FIG. 5, their front clamping section is rather massive to enable application of a longitudinal forging strain of the joint during welding.

Figure 8:
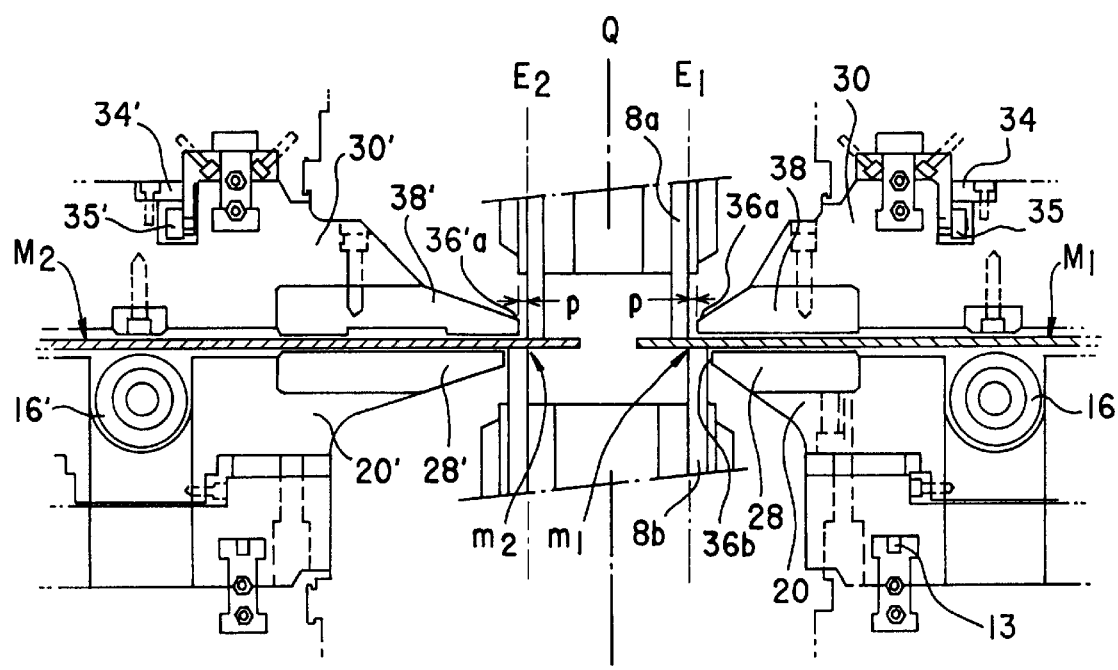
FIG. 8 is a diagrammatical, transversally sectional view, of the shearing of both edges.
Figure 9:
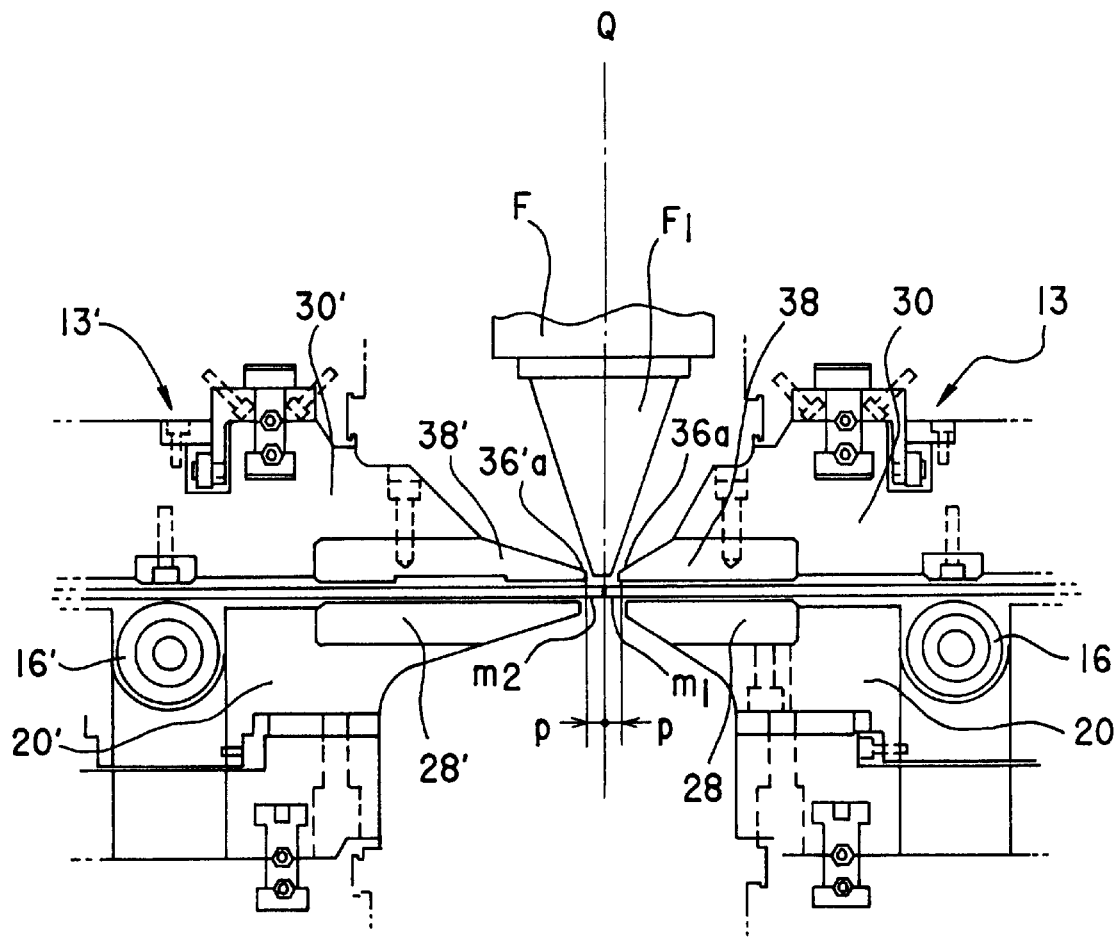
FIG. 9 is a diagrammatical, transversally sectional view, of the passage of a laser-welding torch.

Conversely, as shown on FIGS. 7, 8, 9, the front clamping sections of the 'laser' jaws 20, 30, 20', 30' form a tapered nose 28, 38, 28', 38' whose tip reaches an end 36, 36' as close as possible to the shearing plane E1, E2. As shown on FIG. 8, the noses thus formed at the ends of the clamping jaws are not necessarily symmetrical, whereas their tapered shape depends on the gauge to allow for the passage of the section of the laser equipment that must remain close to the welding spot. Generally, the external faces of the clamping parts 28, 38, 28', 38' will be tilted with respect to the horizontal of an angle greater than 45°.

Besides, it is advantageous, as shown on FIG. 8, to offset slightly the end 36a of the upper jaw 30 with respect to the end 36b of the lower jaw 20 that is slightly provided apart. Thus, the lower blade 8b may travel partially below the upper nose 38 so that the shearing plane E1 is as close as possible to the end 36a of the said nose. The cantilever (p), i.e. the distance between the shearing plane E1 and the end 35a of the jaw can thus be reduced as much as possible and is confined, in practice, to a few millimetres.

Thanks to the tapered shape of the noses 35 of the lamping jaws and to the very small cantilever (p) that can be provided thus between the shearing plane and the ends 36 of the jaws, both sheet metals are held perfectly by the clamping jaws up to immediate proximity of the shearing plane. The shearing line provided can thus be perfectly rectilinear. Besides, the use of a double shears comprising two pairs of blades mounted on a same support enables to perform two shearing lines that are rigorously parallel.

It should be noted that the offset of the end 36b of the lower jaw 20 with respect to the end 36a of the upper jaw 30 improves the quality of the shearing, whereby the sheet metal is pushed against the upper jaw by the lower blade 8b.

Once both rigorously parallel shearing lines m1, m2 have been realised, they can be brought close together by moving the mobile stand 1', in the position represented on FIG. 9. At the same time, by moving the tool carriage A, the laser welding equipment L has been placed in a working position centred on the plane Q. As shown on FIG. 9, the cantilevers (p) left between each shearing line and the corresponding jaw are determined so that the distance 2p existing between the facing ends 36a, 36'a, of the upper jaws 30, 30' enable simply the laser torch L to go through, moving along the joint under the effect of the working actuator 41.

The whole installation that has just been described enables therefore to weld bands, either by flash butt welding or by laser welding, while using special clamping jaws that enable perfect shearing of the edges to engage. Replacing flash butt welding jaws with laser welding jaws can be very quick, while holding the running band inside the machine.

It ensures that changing the jaws does not increase the necessary downtime of the running process, in all cases, for butting two successive bands together.

But the invention is not restricted to the details of the embodiment that has just been described and can be subject to variations without departing from the scope defined by the claims.

In particular, the clamping jaws that have been described could exhibit another form enabling excellent shearing and allowing for the passage of a laser torch.

On the other hand, other guiding means could be used to allow transversal sliding of the jaws from a standby chassis to the machine and conversely.

Finally, it is advantageous to use a tool carriage as described in the previous patent 2.756.504, but the means according to the invention could be adapted to other constructive arrangements.

It should be noted, besides, that the invention has been developed especially for the realisation, if required, of a laser welding, but other welding modes could be contemplated, for example arc welding or electron beam welding.

The reference signs inserted after the technical features mentioned in the claims solely aim at facilitating the understanding of the said and do not limit their extent whatsoever.

What is claimed is:

1. A machine for butting together metal bands (M1, M2) moving one after the other along a longitudinal running axis (x'x), comprising two locking stands (1, 1') that can be moved longitudinally with respect to one another, on which are mounted, respectively, two members for locking (11), respectively, the downstream end, in the running direction, of a first band (M1) and (11') the upstream end of a second band (M2), each comprising, on either side of a running plane of the bands, two vices (12, 13) (12', 13') on which are fixed, in a removable fashion, two pairs of jaws (2, 3) (2', 3') for clamping, respectively, the end of each band (M1, M2), whereas the said vices can be moved from a spaced apart position in which the jaws can be removed, and a close position, and means for welding two parallel edges (m1, m2) provided respectively on the said ends, respectively downstream and upstream, of both bands (M1, M2), after bringing the said edges closer to one another by longitudinal displacement of the said locking members (11, 11') towards one another, whereas the said welding means operate respectively at least according to two different welding modes (V, L), characterised in that it is provided with at least two clamping jaw assemblies (2, 3, 2', 3') (20, 30, 20', 30') suitable, for each assembly, respectively to each welding mode (V, L), whereas the said clamping jaws are mounted in order to slide over each corresponding vice (12, 13) (12', 13') and connected with transfer means (D, F), respectively of a first jaw assembly (2, 3) (2', 3') from a working position (S) centred on the running axis (x'x) to a laterally spaced apart standby position and of a second assembly (20, 30) (20', 30'), from a standby position to the working position (S).

2. A butting machine according to claim 1, characterised in that it comprises a central guiding assembly (G) comprising, on each stand (1, 1'), a pair of guiding paths (G2, G3) provided respectively on both vices (12, 13) of each locking member (1 1, 11') and comprising each at least one supporting rail (21, 15) sliding, respectively for each jaw of the corresponding locking member (11, 11'), whereas each central guiding path (G2, G3) extends transversally to the running direction (x'x), between two lateral sides of the stand (1, 1') of the machine (S) and the said machine is connected with at least one standby chassis placed on at least one side of the machine (S) and carrying at least one lateral guiding assembly (H) comprising two pairs of guiding paths (H2, H3, H'2, H'3) respectively for both jaws of each locking member (11, 11') each comprising of at least one rail (72, 73) placed respectively in the extension of the corresponding rail (21, 15) of the corresponding vice (12, 13), at least in a relative position of the standby chassis with respect to both stands (1, 1') to allow transfer, by sliding on the aligned rails, of a first clamping jaw assembly (2, 3, 2', 3') from their working position (S) to the standby chassis and, conversely, of a second clamping jaw assembly (20, 30, 20', 30') from the standby chassis to the working position (S).

3. A butting machine according to claim 2, characterised in that it comprises two lateral guiding assemblies, respectively, a first lateral assembly (K) that is empty initially for the reception of a first clamping jaw assembly (2, 3, 2', 3') from the working position (S) by sliding over the aligned rails, respectively (21, 15) of the central guiding assembly (G) and (52, 53) of the said first lateral assembly (K), and a second lateral guiding assembly (H) for standby support of a second clamping jaw assembly (20, 30) (20', 30') and transfer of the said clamping jaws into the working position (S) after retraction of the said jaw assembly (2, 3) (2', 3') and alignment of the rails (72, 73) of the said second lateral assembly (H) with those (21, 15) of the central guiding assembly (G).

4. A butting machine according to claim 3, characterised in that both lateral guiding assemblies (K, H) are provided respectively on two standby chassis (E, B) placed on either side of the machine (S), whereas the central assembly (G) and both lateral assemblies (K, H) are centred on a same mean transversal plane (Q) for relative position of both locking stands (1, 1') in which each rail (21, 15) of the central assembly (G) is aligned at each end, with a corresponding rail (52, 53) (72, 73) of a lateral assembly (K, H).

5. A butt welding machine according to claim 4, characterised in that a first clamping jaw assembly (2, 3) (2', 3') is mounted, in working position, on the central guiding assembly (G) and a second clamping jaw assembly (20, 30) (20', 30') is mounted in standby position on the rails (72, 73) of a lateral guiding assembly (H) provided on a second standby chassis (B), whereas the machine (S) comprises means (D, F) for simultaneous transfer of the second jaw assembly (20, 30) (20', 30') from its standby position (B) to the working position (S) on the central guiding assembly (G) with retraction of the first jaw assembly (2, 3) (2', 3') and transfer of the said assembly from its working position (S) to a standby position on a lateral guiding assembly (K) provided on a first standby chassis (E), on the other side of the machine (S).

6. A butting machine according to any one of claims 2 to 5, characterised in that each locking member (1, 1') comprises two vices (12, 13) (12', 13') on which are fixed in a removable fashion, respectively both jaws of the corresponding locking member (11, 11'), whereas the said vices (12, 13) (12', 13') are movable with respect to one another perpendicular to the running plane from a position for clamping the jaws and a spaced apart position, characterised in that the rails of both lateral guiding assemblies (H, K) are placed at two levels (H2, H3) (K2, K3) corresponding respectively to the levels of the rails (21, 15) of the central assembly (G) provided respectively on both vices of each stand (1, 1'), in the position where the clamping jaws are spaced apart, in order to allow transfer and replacement of the said jaws while travelling, respectively, above and below the running plane of the bands.

7. A butting machine according to any one of previous claims 2 to 5, characterised in that it comprises a first clamping jaw assembly (2, 3) (2', 3') that, in the working position (S), is connected respectively to two terminals of an electric power source for flash butt welding, and a second clamping jaw assembly (20, 30) (20',30') suitable to the passage of a laser torch along a transversal direction parallel to the edges to be welded after the said edges have been engaged.

8. A butting machine according to claim 5, characterised in that the jaws of the first clamping jaw assembly (2, 3) (2', 3'), suitable to flash butt welding each comprise a removable fastening section on the lengthened vice (12, 13) (12', 13'), on the side of the edge to be welded, by quite a thick lip to enable application of a forging pressure between the edges to be welded and that the jaws of the second clamping jaw assembly (20, 30) (20', 30'), suitable to laser beam welding each comprise a removable fastening section on the lengthened vice (12, 13) (12', 13'), on the side of the edge to be welded, by a nose (38) extending as close as possible to the edge to be welded in order to maintain the band over its whole width during the shearing process, whereas the said nose (38) is thin enough to allow passage of a laser beam welding equipment (L).

9. A butting method for two metal bands (M1, M2) moving one after the other along a longitudinal running direction (x'x), while passing through a welding machine comprising two locking members (11, 11') mounted respectively on a fixed stand (1) and on a mobile stand (1') movable longitudinally with respect to the fixed stand, whereas each locking member comprises two clamping jaws (2, 3) (2', 3') placed respectively above and below a substantially horizontal running plane of the bands and fixed removably, respectively on two vices (12, 13) (12', 13') movable vertically, with respect to one another, between a position where the jaws are spaced apart and a position where the jaws are close together, characterised in that two successive bands can be welded according to either of at least two different welding modes in relation to the nature and/or the thickness of the bands and at least two clamping jaw assemblies are available, each suitable to one of the welding modes, respectively a first clamping jaw assembly that is mounted in operation in the machine and at least one second assembly that is placed in standby beside the machine, so that, when changing welding modes, the first clamping jaw assembly used previously for welding according to a first mode can be removed from the machine and replaced immediately by the second clamping jaw assembly suitable to the second welding mode.

10. A butting method according to claim 9, characterised in that the jaws can be replaced when the vices are spaced apart, by sliding the jaws, respectively above and below the running direction of the band and without engagement with the said band, so that, when changing welding modes between the downstream end of a first band and the upstream end of a second band, the first jaw assembly placed in the machine and suitable to the previous welding mode can be removed from the machine and replaced with a second assembly suitable to the following welding mode, as the first band is running to an end and without stopping the said from running.

11. A butting method according to any one of claims 9 and 10, characterised in that, to change welding mode, the first clamping jaw assembly (2, 3, 2', 3') suitable to the previous welding mode, is removed from the machine (S) and transferred to a first standby chassis (E) placed on a first side of the machine (S) and the second clamping jaw assembly (20, 30, 20', 30') suitable to the following welding mode is transferred to the machine (S) from a second standby chassis (B) placed previously as a spare on the second side of the machine (S).

12. A butting machine according to claim 6, characterised in that it comprises a first clamping jaw assembly (2, 3) (2', 3') that, in the working position (S), is connected respectively to two terminals of an electric power source for flash butt welding, and a second clamping jaw assembly (20, 30) (20', 30') suitable to the passage of a welding torch along a transversal direction parallel to the edges to be welded after the said edges have been engaged.

* * * * *